United States Patent [19]

Whittington et al.

[11] Patent Number: 4,719,567
[45] Date of Patent: Jan. 12, 1988

[54] METHOD AND APPARATUS FOR LIMITING BUS UTILIZATION

[75] Inventors: Charles L. Whittington, Buda; John Zolnowsky, Austin, both of Tex.

[73] Assignee: Motorola, Inc., Schaumburg, Ill.

[21] Appl. No.: 373,206

[22] Filed: Apr. 29, 1982

[51] Int. Cl.⁴ .................. G06F 11/34; G06F 13/36
[52] U.S. Cl. .............................................. 364/200
[58] Field of Search ... 364/200 MS File, 900 MS File; 370/85; 340/825.5

[56] References Cited

U.S. PATENT DOCUMENTS

| | | | |
|---|---|---|---|
| 3,810,120 | 5/1974 | Huettner et al. | 371/11 |
| 3,840,859 | 10/1974 | Vigil et al. | 364/200 |
| 4,209,838 | 6/1980 | Alcorn, Jr. et al. | 364/200 |
| 4,210,780 | 7/1980 | Hopkins et al. | 370/85 |
| 4,271,465 | 6/1981 | Ohtsuka et al. | 364/200 |
| 4,320,467 | 3/1982 | Glass | 364/900 |
| 4,344,132 | 8/1982 | Dixon et al. | 364/200 |
| 4,379,294 | 4/1983 | Sutherland et al. | 340/825.5 |
| 4,387,425 | 6/1983 | El-Gohary | 364/200 |

*Primary Examiner*—Eddie P. Chan
*Attorney, Agent, or Firm*—John A. Fisher; Jeffrey Van Myers

[57] ABSTRACT

A bus master is prevented from utilizing a communication bus during a current sample interval if the utilization rate of the communication bus during the immediately preceeding sample interval exceeded a selected limit.

6 Claims, 5 Drawing Figures

METHOD AND APPARATUS FOR LIMITING BUS UTILIZATION

BACKGROUND OF THE INVENTION

1. Field of the Invention

The present invention relates generally to devices which share the use of a communication bus or the like, and, more particularly, to a method and apparatus for limiting the utilization of that communication bus by a given device.

2. Background Art

In simple data processing systems, the central processing unit communicates directly with each of the peripherals and memory circuits via direct, dedicated communication lines. In more sophisticated data processing systems, a communication bus is used to couple the central processing unit to one or more memory units, peripheral controllers, channel controllers, and the like. In some of the systems, devices other than the central processing unit are allowed to request and receive temporary control of the communication bus from the central processing unit. Typically, these "bus masters" utilize the communication bus to rapidly perform their assigned tasks, and then return control of the communication bus to the central processing unit. However, performance of the central processing unit and, in fact, the system as a whole, can be severely degraded if the bus masters other than the central processing unit are allowed to consume an excessive proportion of the available bandwidth of the communication bus.

In the past, some systems have limited the ability of each bus master to monopolize the communication bus by allowing only a single operation to be performed during each bus grant. This single transfer technique is generally inpractical in systems which incorporate the newer forms of intelligent peripheral controllers, disc controllers, and the like, which are most effective for performing burst type transfers. In the latter type of system, the system software is typically designed to restrict the size of those operations which must be performed by the bus master during a single burst of activity on the communication bus. This software limitation technique imposes substantial overhead on the system.

SUMMARY OF THE INVENTION

Accordingly, it is an object of the present invention to provide a method for limiting the utilization of a communication bus by a bus master.

Another object of the present invention is to provide an apparatus suitable for implementation in a bus master for limiting the utilization of a communication bus by that bus master.

Still another object of the present invention is to provide a method and an apparatus for limiting the utilization of the communication bus by a bus master which requires the minimal amount of interaction with other system components.

These and other objects of the present invention are achieved in a method for limiting the utilization of a communication bus by a bus master, comprising the steps of: determining the utilization rate of the communication bus during a first sample interval; and disabling the bus master from utilizing the communication bus during a succeeding second sample interval if the utilization rate of the communication bus during the first sample interval was determined to be above a predetermined threshold.

An apparatus for limiting the utilization of the communication bus by the bus master comprises: means for establishing a succession of sample intervals of predetermined duration; means coupled to the communication bus for determining the utilization rate of the communication bus during one of the sample intervals; and means coupled to the bus master for disabling the bus master from utilizing the communication bus during the next successive sample interval if the utilization rate during the one sample interval was determined to be above a predetermined threshold.

DESCRIPTION OF THE INVENTION

Figure 1:
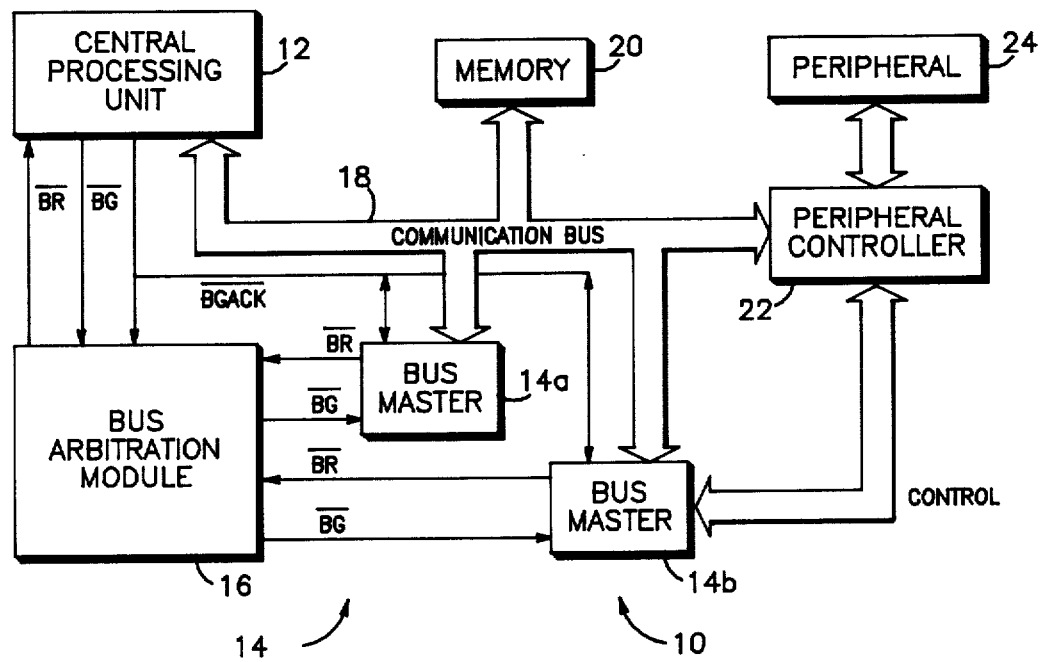
FIG. 1 is a schematic representation of a data processing system which practices the method of the present invention.

Shown in FIG. 1 is a data processing system 10 generally comprising a central processing unit 12 and a plurality of substantially autonomous bus masters 14 which arbitrate via a bus arbitration module 16 for the right to request the use of a communication bus 18 managed by the central processing unit 12. Each of the bus masters 14 is constructed to perform one or more types of data transfer operations which may be assigned by the central processing unit 12 to satisfy requirements of the executing user or operating system software. For example, the bus master 14a may be adapted to cooperate with a memory 20 to transfer a block of data from one location in the memory 20 to another location therein. In contrast, the bus master 14b may be adapted to exercise control over a peripheral controller 22 to achieve the transfer of a block of data between the memory 20 and a particular peripheral 24. However, the illustrated forms of the bus master 14a and the bus master 14b are by way of example only, since numerous configurations are possible. If only one bus master 14 is present, the bus arbitration module 16 may be deleted and the bus request (BR) and bus grant (BG) signals coupled directly to the CPU 12.

In operation, the central processing unit 12 will transfer all control information necessary to define a particular data transfer task to an appropriate one of the bus masters 14 via the communication bus 18. The central processing unit 12 will then activate the selected bus master 14 to independently perform the assigned task. Upon activation, the selected bus master 14 will assert a bus request (BR) signal requesting the right to use the communication bus 18 for a particular transfer operation related to the assigned task. The bus arbitration module 16 receives the bus request (BR) signal from the selected bus master 14, together with any bus request (BR) signal asserted by the other bus masters 14, and forwards a representative bus request (BR) signal to the central processing unit 12. The central processing unit 12, which is typically assigned the lowest priority, will assert a bus grant (BG) signal to the bus arbitration module 16 as soon as the communication bus 18 becomes available. The bus arbitration module 16 then forwards the bus grant (BG) signal to the requesting bus master 14 which has been assigned the highest priority. This privileged bus master 14 responds to the bus grant (BG) signal by asserting a bus grant acknowledge (BGACK) signal, and proceeds to perform the appropriate data transfer operation using the communication bus 18. Upon completion of the transfer operation, the privileged bus master 14 relinquishes the communication bus 18 by negating the bus grant acknowledge (BGACK) signal. In response to the negation of the bus grant acknowledge (BGACK) signal, if another one of the bus masters 14 is still requesting use of the communication bus 18, the bus arbitration module 16 reasserts the bus request (BR) signal to the central processing unit 12 and the cycle is repeated.

Depending upon the activity of the several bus masters 14, the central processing unit 12 may be effectively precluded from utilizing the communication bus 18 for substantial periods of time, particularly if one or more of the bus masters 14 performs multiple data transfer operations each time the communication bus 18 is granted. In the method of the present invention, a bus master 14, particularly one which is capable of performing a burst type operation, can be limited in its ability to utilize the communication bus during a particular time interval based upon the bus activity during a preceding time interval.

Figure 2:
FIG. 2 is a time line depicting the operation of the bus masters in FIG. 1 according to the present method.

Shown in FIG. 2 is a time representation of the method of the present invention wherein the activity of a bus master 14 is divided into a succession of sample intervals comprising a selected number of clock cycles of the bus master 14. During each such sample interval, the bus master 14 determines the utilization rate of the communication bus 18 as the ratio of the number of clock cycles during which the bus grant acknowledge (BGACK) signal is active to the number of clock cycles comprising the sample interval. If the utilization rate of the communication bus 18 during a particular sample interval is determined to be above a selected threshold, the bus master 14 will be prevented from arbitrating for the use of the communication bus 18 during the next successive sample interval. On the other hand, if the utilization rate is determined to be below the predetermined threshold, the bus master 14 will be allowed to contend for the right to use the communication bus 18. In the preferred form, the bus master 14, if allowed, will contend for the use of the communication bus 18 only during a selected burst window within a given sample interval.

Figure 3A:
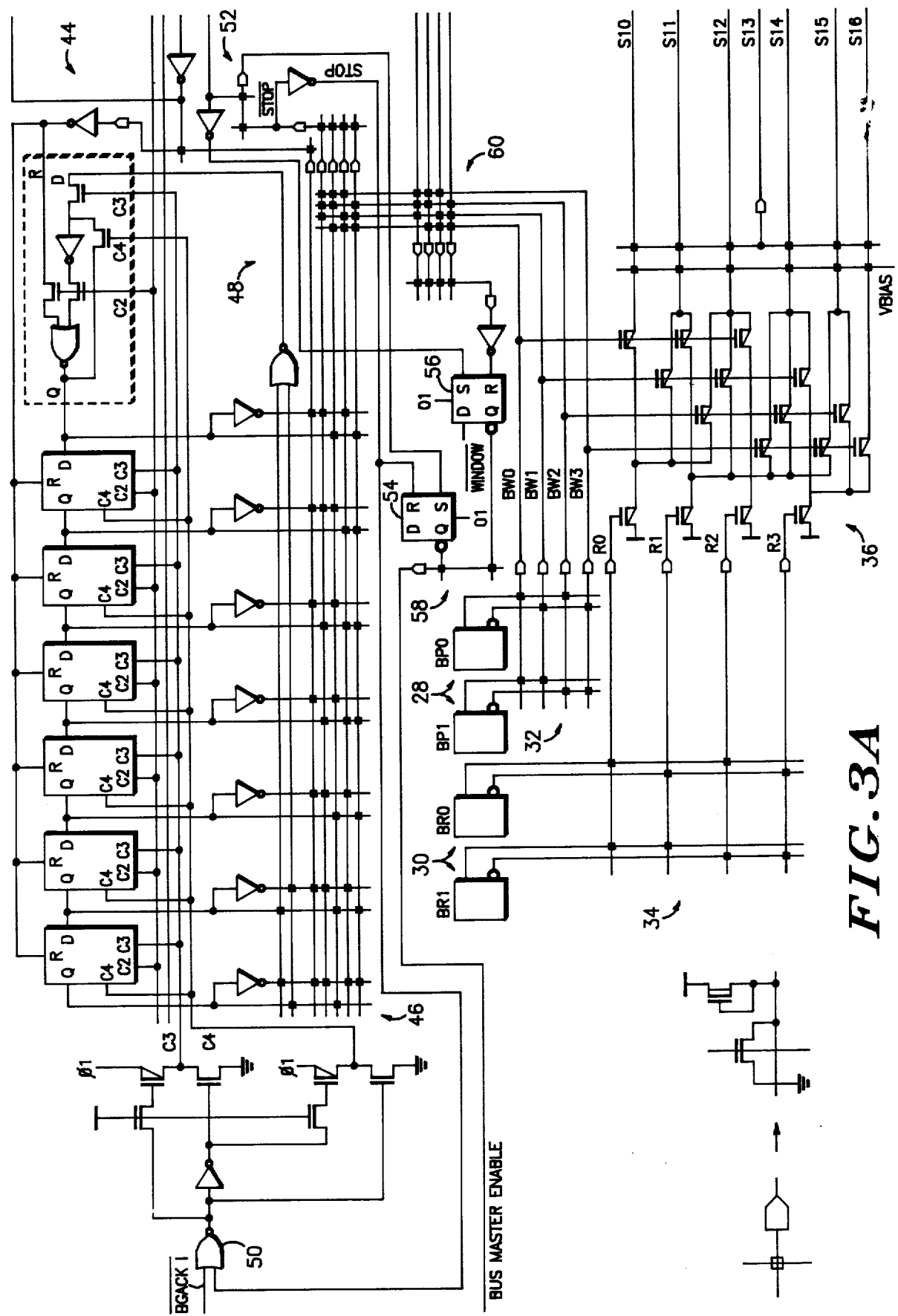
FIG. 3 illustrates the relationship of the schematic diagrams shown in FIGS. 3A and 3B of an apparatus for practicing the method of the present invention.
Figure 3B:
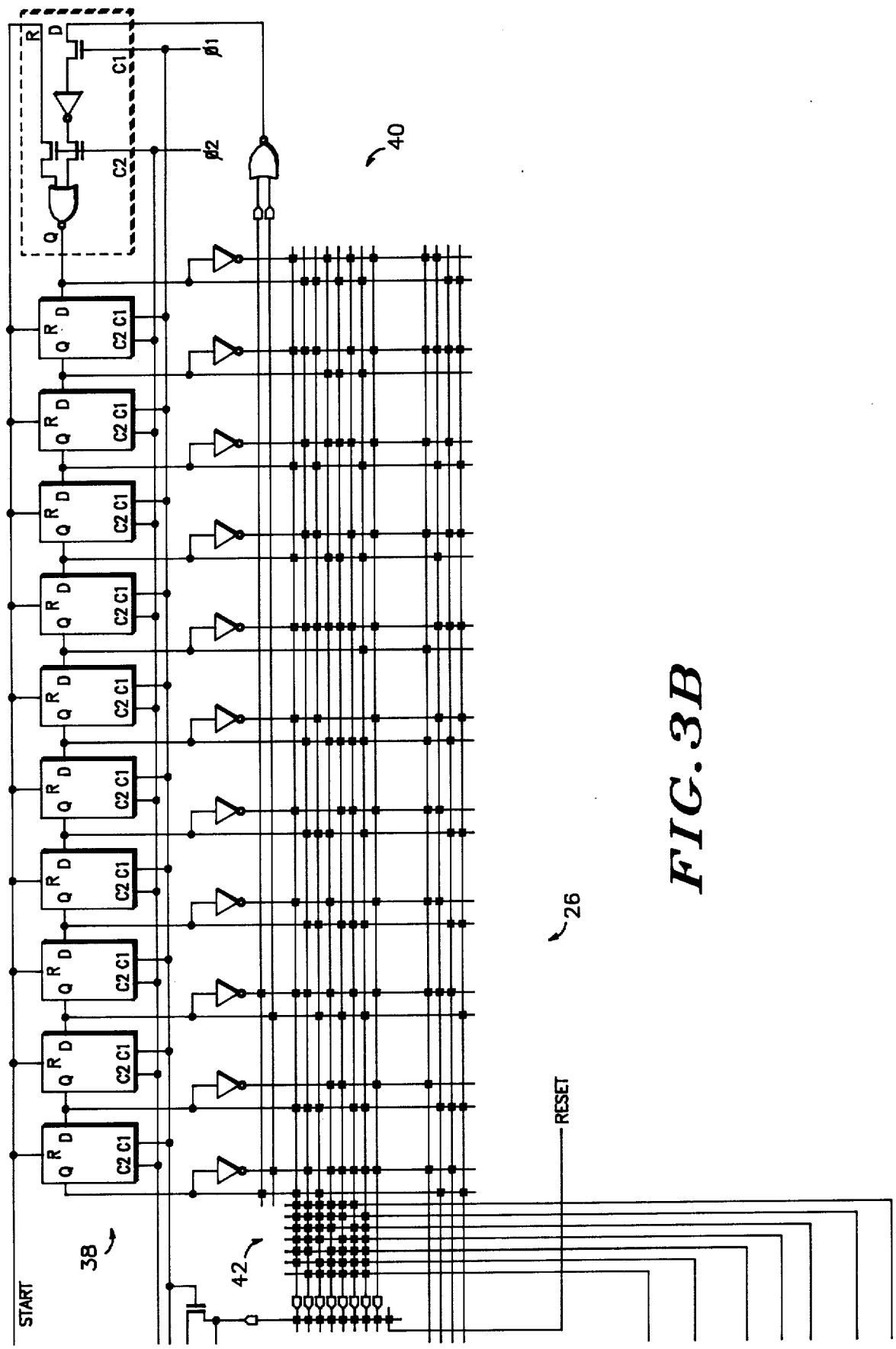

Shown in FIGS. 3A and 3B is a utilization rate limiter 26 suitable for practicing the method of the present invention in a bus master 14. In the preferred form, the rate limiter 26 includes a burst time (BT) register 28 and a bandwith ratio (BR) register 30 of conventional form which are loadable under control of the central processing unit 12 with parameters to select the number of clock cycles in the burst window (BW) and the sample interval (SI), respectively. In the illustrated form, the contents of the BT register 28 are decoded via a BT decoder PLA 32 of conventional form to select one of four implemented burst window (BW) lengths according to the relationship:

$$BW = 2^{**}(BT+4);$$

while the contents of the BR register 30 are decoded via a BR decoder PLA 34 of conventional form to select one of four implemented bandwidth ratios (R) according to the relationship:

$$R = BW/SI = 1/(2^{**}(BR+1)).$$

Thus the outputs of the BR decoder PLA 32 and the BT decoder PLA 34 can be logically combined via an AND array 36 to select one of seven implemented sample interval (SI) lengths according to the following relationship:
$$SI = 2^{**}(BT+BR+5).$$

In the illustrated form, the contents of the BT register 28 also selects the bus utilization rate limit (U) as a function of measured bus activity (BA) and sample interval (SI), according to the following relationship:
$$U = BA/SI = 1/(2^{**}(BR+1)).$$

A sample interval (SI) counter 38 of the Johnson type increments the count therein each clock cycle. The current value thereof is decoded via an SI decoder PLA 40 of conventional form to provide one set of inputs to an SI control PLA 42 of conventional form. When the output of the SI decoder PLA 40 indicates that the count in the SI counter 38 equals the particular sample interval length selected via the SI outputs of the AND array 36, the SI control PLA 42 generates a start (START) signal to reset the SI counter 38 to the initial starting value and begin a new sample interval.

A bus activity (BA) counter 44 of the Johnson type increments the count therein each clock cycle if the internal form of the bus grant acknowledge (BGACKI) signal indicates that the communication bus 18 is being used during that particular clock cycle. The current count thereof is decoded via a BA decoder PLA 46 of conventional form to provide one set of inputs to a BA control PLA 48 of conventional form. When the output of the BA decoder PLA 46 indicates that the count in the BA counter 44 equals the particular burst window value selected via the BW outputs of the BT decoder PLA 34, the BA control PLA 48 generates a stop (STOP) signal to close a BGACKI gate 50 and freeze the count in the BA counter 44 until the next START signal resets the BA counter 44 to the initial starting value to begin a new bus activity count.

If, upon the generation of the START signal at the end of the previous sample interval and the start of the present sample interval, the STOP signal is not present indicating that the bus activity during the previous sample interval did *not* exceed the selected bus activity limit, a BA enable PLA 52 of conventional form will set a conventional BA latch 54 to indicate that bus activity is allowed during the present sample interval. The START signal also sets a BW latch 56 of conventional form to indicate the start of a burst window. Under these circumstances, a bus master enable PLA 58 of conventional form generates a bus master enable signal to enable the bus master 14 being controlled to contend for use of the communication bus 18. When the output of the SI decoder PLA 40 indicates that the count in the SI counter 38 equals the particular burst window value selected via the BW outputs of the BT decoder PLA 32, a BW control PLA 60 of conventional form resets the BW latch 56 to indicate the end of the burst window to the bus master enable PLA 58 and terminate the bus master enable signal.

If, on the other hand, during the previous sample interval, the STOP signal was generated via the BA control PLA 48 indicating that the bus activity during that sample interval did exceed the selected bus activity limit, the BA latch 54 will have been reset to indicate that bus activity should not be allowed during the present sample interval. In addition, the continued presence of the "frozen" STOP signal upon the occurance of the START signal for the present sample interval will disable the BA enable PLA 52 and prevent the setting of the BA latch 54. Thus, even though the BW latch 56 will be set by the START signal to indicate the start of the present burst window, the reset BA latch 54 will prevent the bus master enable PLA 58 from generating the bus master enable signal, and the bus master 14 will be prevented from contending for use of the communication bus 18 during the present sample interval.

In the preferred form, the rate limiter 26 is incorporated into each bus master 14 for which limited rate access is desired. However, the rate limiting function may, if desired, be implemented in the bus arbitration module 16, or may even be fabricated into a standalone device. These and other changes may be made to the method and apparatus disclosed herein without departing from the spirit and scope of the present invention as defined in the following claims.

What is claimed is:

1. A method for limiting the utilization of a communication bus by a bus master, comprising the steps of:
    determining the utilization rate of the bus during a first sample interval; and
    disabling the bus master from utilizing the bus during a succeeding second sample interval if the utilization rate during the preceeding first sample interval was determined to be above a selected limit.

2. The method of claim 1 wherein the bus master arbitrates for the use of the bus, and wherein the step of disabling the bus master is further characterized as preventing the bus master from arbitrating for the use of the bus during the succeeding second sample interval if the utilization rate during the preceeding first sample interval was determined to be above the selected limit.

3. The method of claim 1 or 2 wherein the first sample interval comprises a predetermined number of clock cycles of the bus master, and wherein the utilization rate is determined as the ratio of the number of the clock cycles during which the bus is utilized during the first sample interval to the number of the clock cycles comprising the first sample interval.

4. A bus utilization rate limiter for limiting the utilization of a communication bus by a bus master, comprising:
    means coupled to said bus, for determining the utilization rate of the bus during a first sample interval; and
    means coupled to said bus master and to said means for determining the bus utilization rate, for disabling the bus master from utilizing the bus during a succeeding second sample interval if the utilization rate during the preceeding first sample interval was determined to be above a selected limit.

5. The bus utilization rate limiter of claim 4 wherein the bus master arbitrates for the use of the bus, and wherein the means for disabling the bus master are further characterized as means for preventing the bus master from arbitrating for the use of the bus during the succeeding second sample interval if the utilization rate during the preceeding first sample interval was determined to be above the selected limit.

6. The bus utilization rate limiter of claim 4 or 5 wherein the first sample interval comprises a predetermined number of clock cycles of the bus master, and wherein the utilization rate is determined as the ratio of the number of the clock cycles during which the bus is utilized during the first sample interval to the number of the clock cycles comprising the first sample interval.

* * * * *